United States Patent
Yoon et al.

(10) Patent No.: US 9,517,900 B2
(45) Date of Patent: Dec. 13, 2016

(54) DREDGED SOILS LONG DISTANCE TRANSPORT SYSTEM USING MAGNETIC FIELD AND TORNADO AND ITS CONTROL METHOD THEREOF

(71) Applicant: Korea Institute Of Ocean Science & Technology, Gyeonggi-do (KR)

(72) Inventors: Gil-Lim Yoon, Gyeonggi-do (KR); YuSeung Kim, Seoul (KR)

(73) Assignee: KOREA INSTITUTE OF OCEAN SCIENCE & TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 14/388,812

(22) PCT Filed: May 29, 2014

(86) PCT No.: PCT/KR2014/004779
§ 371 (c)(1),
(2) Date: Sep. 28, 2014

(87) PCT Pub. No.: WO2015/115703
PCT Pub. Date: Aug. 6, 2015

(65) Prior Publication Data
US 2016/0325948 A1 Nov. 10, 2016

(30) Foreign Application Priority Data

Jan. 29, 2014 (KR) ........................ 10-2014-0011285

(51) Int. Cl.
*B65G 54/02* (2006.01)
*B65G 53/30* (2006.01)
*B65G 53/52* (2006.01)

(52) U.S. Cl.
CPC ............... *B65G 54/02* (2013.01); *B65G 53/30* (2013.01); *B65G 53/52* (2013.01); *B65G 53/525* (2013.01);
(Continued)

(58) Field of Classification Search
CPC ......... B65G 53/10; B65G 53/58; B65G 54/02; B65G 2812/99
(Continued)

(56) References Cited

U.S. PATENT DOCUMENTS

3,632,229 A * 1/1972 VonStarck ........... B22D 39/006
198/619
3,760,245 A * 9/1973 Halvorsen ............ B65G 54/025
104/154
(Continued)

*Primary Examiner* — Joseph Dillon, Jr.
(74) *Attorney, Agent, or Firm* — The PL Law Group, PLLC (57) ABSTRACT

A long distance dredged soil transport system includes a pump module including a pump for generating a compressed air and a plug flow flowing by dividing an inner state of a pipeline to a gaseous unit and a liquefied unit by introducing the generated compressed air into the pipeline by being interlinked to one lateral surface of the pipeline, a pipe module wound with a coil to apply an electromagnetic wave to the liquefied unit and including a plurality of pipelines, database stored with flow information on flow velocity and flow form in response to physical properties of liquefied unit, and a control module communicating with the pipe module, the pump module and the database and applying, to the coil, a waveform of a current matching to a flow waveform of the liquefied unit transported inside the pipeline, and a control method thereof.

10 Claims, 4 Drawing Sheets

(52) U.S. Cl.
CPC ..... *B65G 2201/045* (2013.01); *B65G 2207/14* (2013.01)

(58) Field of Classification Search
USPC ............ 406/50, 85, 192, 197, 198; 198/619; 73/570.5
See application file for complete search history.

(56) References Cited

U.S. PATENT DOCUMENTS

| | | | | |
|---|---|---|---|---|
| 4,092,086 | A | * | 5/1978 | von Starck ............ H02K 44/06 198/619 |
| 4,534,856 | A | * | 8/1985 | Weiss ...................... B03C 7/026 209/1 |
| 6,029,519 | A | * | 2/2000 | Kuklinski ............. G01M 10/00 181/0.5 |
| 6,185,084 | B1 | * | 2/2001 | Tai .......................... B03C 3/885 361/225 |
| 8,118,156 | B2 | * | 2/2012 | Kondoh .............. B01L 3/50273 198/619 |
| 8,166,819 | B2 | * | 5/2012 | Wanis .................. B01D 21/283 73/570.5 |
| 2011/0314914 | A1 | * | 12/2011 | Gregg ...................... H03B 5/30 73/570.5 |
| 2013/0047728 | A1 | * | 2/2013 | Cochran ........... B01L 3/502761 73/570.5 |
| 2014/0224620 | A1 | * | 8/2014 | Fullerton .............. H01F 7/0247 198/617 |
| 2014/0309479 | A1 | * | 10/2014 | Weinberg ................. A61N 2/02 600/12 |

* cited by examiner

DREDGED SOILS LONG DISTANCE TRANSPORT SYSTEM USING MAGNETIC FIELD AND TORNADO AND ITS CONTROL METHOD THEREOF

CROSS REFERENCE TO RELATED APPLICATIONS AND CLAIM OF PRIORITY

This patent application is a National Phase application under 35 U.S.C. §371 of International Application No. PCT/KR2014/004779, filed May 29, 2014, which claims priority to Korean Patent Application No. 10-2014-0011285, filed Jan. 29, 2014, entire contents of which are incorporated herein by reference.

BACKGROUND

Technical Field

The present invention relates to a long distance dredged soil transport system using magnetic field and tornado eddy current technique, and a control method thereof, and more particularly to a long distance dredged soil transport system configured to increase dredged soil transport efficient by decreasing dredged soil transport pressure using electromagnetic field by generating plug flow, and a control method thereof.

Background Invention

Dredged soils are soils deposited on rivers or oceans for obtaining soils and sands necessary for construction sites, and although river dredged soils are of good quality, ocean dredged soils are preferred due to the river dredged soils being limited in quantity and feared to cause river pollution and/or ecocide, and therefore, the ocean dredged soils and techniques of collecting the ocean dredged soils are being focused.

Methods of collecting the ocean dredged soils and transporting to a destination may be largely divided to three types. That is, a transport method using pipelines, a transport method using conveyors and a transport method using dump trucks.

Where, although the conveyor-using transport method is advantageous in that the conveyor-using transport method is adequate to a long-distance transport of dredged soils, the conveyor-using transport method is disadvantageous in that transport equipment and installation costs are expensive, and repair/maintenances are not easy.

Although the dump truck-using transport method is largely used, the dump truck-using transport method is not economically advantageous due to generation of noise and dusts when long transport distance is required.

Although it is general that the pipeline-using transport method is currently used, there may be lots of technical problems to be technically solved when dredged soils are transported long distance over 30 km.

Although the long distance transport of dredged soils take consideration of using relay pump methods using a booster line and transport methods using a siphon principle, these methods also entail problems of increasing dredging costs.

To be more specific, many stations are required for transport of dredged soils, that is, many high performance pumps are required at every place where fluids are pressurized and flow velocity is acquired, whereby installation costs of pumps and fuel costs for using the pumps increase geometrically.

Furthermore, material costs and installation costs of pipelines greatly increase because pressure inside the pipelines is high. Currently used pipelines are cast iron pipes which are not efficient for high pressure.

Another disadvantage is that replacement periods are shortened due to damages to mechanical installation equipment including pipes and wear and tear of pipelines that require withstand of high pressure to thereby increase overall costs.

Still further disadvantage is that it is difficult to find a position of a clogged pipeline when a pipeline is clogged by dredged soils during long-distance transport of the dredged soils, and particularly, it is difficult to repair pipelines when the pipelines buried under ground are clogged and/or when the pipelines are holed.

Thus, it is imperative that efficient transport systems for dredged soils be developed on an urgent base.

SUMMARY

The present invention is provided to solve the various aforementioned problems and it is an object of the present invention to provide a long distance dredged soil transport system configured to promote an efficient dredged soil transport by decreasing resistance to flow of dredged soils inside pipelines by applying a electromagnetic field to the pipelines having a waveform catering to a field situation by grasping flow state during transport of dredged soils and generating plug flow, and a control method thereof.

In one general object of the present invention, there is provided a long distance dredged soil transport system using an electromagnetic field and tornado eddy current technique, the system comprising:

a pump module including a pump for generating a compressed air and generating a plug flow flowing by dividing an inner state of a pipeline to a gaseous unit and a liquefied unit by introducing the generated compressed air into the pipeline by being interlinked to one lateral surface of the pipeline;

a pipe module wound with a coil configured to apply an electromagnetic wave to the liquefied unit and including a plurality of pipelines;

database stored with flow information on flow velocity and flow form in response to physical properties of liquefied unit; and a control module communicating with the pipe module, the pump module and the database wiredly and wirelessly and applying, to the coil, a current of waveform matching to a flow waveform of the liquefied unit transported inside the pipeline.

Preferably, but not necessarily, the pump module may include a pump pressure sensor unit configured to grasp a stroke period of the pump and to convert the grasped stroke period of the pump to a voltage signal, and the pipe module includes a pipe pressure sensor unit configured to grasp flow velocity and waveform of the liquefied unit transported into the pipeline and to convert the grasped flow velocity and the waveform to a pressure signal.

Preferably, but not necessarily, the pipe pressure sensor unit may include a first pressure sensor and a second pressure sensor each installed by being spaced apart at a predetermined distance.

Preferably, but not necessarily, the control module may include a central computation unit configured to generate a flow signal for controlling transport of the liquefied unit by comparing the flow velocity and waveform in response to the physical properties of the liquefied unit received from the database with an actual flow velocity and waveform of the liquefied unit transported into the pipeline, a function generation unit configured to convert the flow signal using a function by receiving the flow signal from the central computation unit, a pulse generation unit configured to convert the voltage signal received from the pipe pressure sensor unit to a pulse signal using the function by receiving the voltage signal received from the pipe pressure sensor unit and by receiving a function from the function generation unit, and a bridge circuit unit configured to receive the pulse signal from the pulse generation unit and to convert a current received from outside to a current having the pulse signal and to apply the converted current to the coil.

Preferably, but not necessarily, the pulse generation unit may include a pulse detection unit configured to detect an amplitude and a period of a pulse of the voltage signal by receiving the voltage signal from the pipe pressure sensor unit, an integral circuit unit configured to convert a pressure waveform energy proportional to a pulse waveform period to a voltage signal by receiving the amplitude and size detected by the pulse detection unit, a PWM (Pulse Width Modulation) generation unit configured to generate a PWM period pulse in response to a pulse waveform period by receiving a voltage signal from the integral circuit unit, and a pulse generation unit configured to convert the PWM period pulse received from the PWM generation unit using the function received from the function generation unit, and to convert the converted PWM period pulse to a gate voltage of the bridge circuit unit.

Preferably, but not necessarily, the system may further comprise a state measurement unit configured to monitor flow velocity and pressure change of the liquefied unit inside the pipeline.

Preferably, but not necessarily, the state measurement unit may monitor the flow velocity and pressure change in flow inside the liquefied unit using the following equation:

$$\nabla p = f * \frac{L}{D} * \frac{\rho}{2} * v^2 \qquad <\text{Equation}>$$

where, f is a friction factor, L is a distance between first pressure sensor and second pressure sensor, D is a diameter of pipeline, ρ is a density of liquefied unit, and v is a flow velocity obtained through pump pressure sensor.

Preferably, but not necessarily, the flow information of the liquefied unit stored in the database may be updatable, additionable, changeable and deletable.

In another general object of the present invention, there is to provided a control method of dredged soil transport system including a pipe module configured to transport dredged soils, a pump module, database and a control module, the method comprising:

a first step of detecting flow velocity and waveform of a
   liquefied unit using a pressure sensor formed on the pipe
   module and the pump module relative to the liquefied unit
   of plug flow flowing by being divided to a gasified state
   and the liquefied unit generated by the pump module;
subsequently, a second step of receiving, by the control
   module, the flow velocity and waveform in response to
   physical properties from the flow velocity, the waveform
   and the database of the liquefied unit detected from the
   first step;
subsequently, a third step of generating a current of waveform matching to flow waveform of the liquefied unit transported inside the pipeline by comparing the flow velocity and waveform in response to the physical properties of liquefied unit received from the database with the flow velocity and waveform of the liquefied unit detected from the first step; and
subsequently, a fourth step of applying the generated current to a coil wound on the pipeline of the pipe module.

Preferably, but not necessarily, the third step may include a 3-1 step of generating a flow signal for controlling transport of the liquefied unit based on an actual flow velocity and waveform of the liquefied unit detected from the first step, subsequently, a 3-2 step of generating a function based on the flow velocity and waveform in response to the physical properties of the liquefied unit received from the database, subsequently, a 3-3 step of converting the flow signal to a pulse signal using the function; and subsequently, a 3-4 step of converting a current received from outside to a current having the pulse signal.

The present invention can advantageously reduce transport costs by transporting dredged soil using a relatively small size of pump capacity when the dredged soil is transported to a long distance area.

Furthermore, the present invention can advantageously reduce damages of various transport equipment caused by long pipeline replacement period and pressure drop because the dredged soil can be transported under an environment where a transport pressure inside a pipeline is relatively low.

Still furthermore, the present invention can advantageously reduce an overall cost of a dredged soil transport system.

DETAILED DESCRIPTION

Hereinafter, exemplary embodiments of the present disclosure will be described in detail with reference to the accompanying drawings. In the drawings, sizes or shapes of constituent elements may be exaggerated for clarity and convenience.

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

Furthermore, throughout the descriptions, the same reference numerals will be assigned to the same elements in the explanations of the figures, and explanations that duplicate one another will be omitted.

Figure 1:
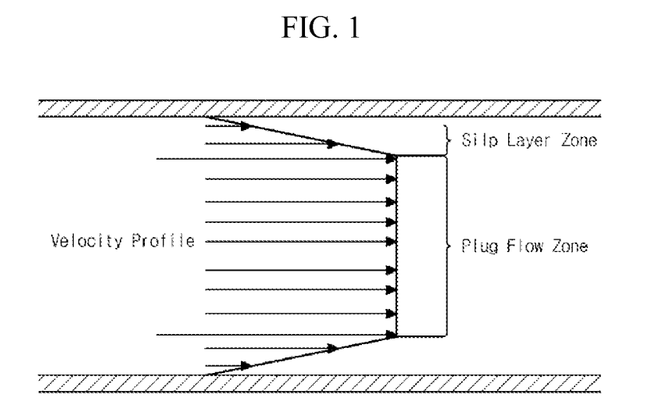
FIG. 1 is a schematic view illustrating flow of dredged soil inside a pipeline.
Figure 2:
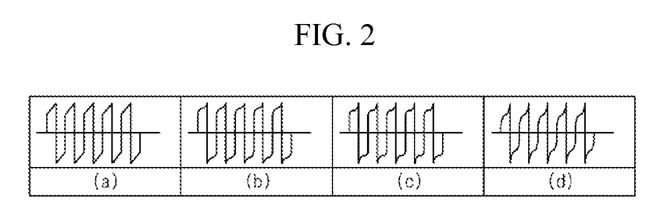
FIG. 2 is a schematic view illustrating a waveform in response to physical properties of fluid mixture.
Figure 3:
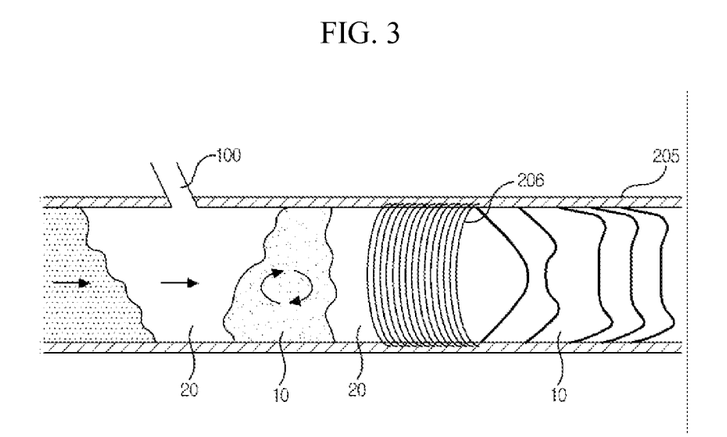
FIG. 3 is a schematic view illustrating change in flow of dredged soil caused by a dredged soil transport system according to an exemplary embodiment of the present invention.

FIG. 1 is a schematic view illustrating flow of dredged soil inside a pipeline, FIG. 2 is a schematic view illustrating a waveform in response to physical properties of fluid mixture, and FIG. 3 is a schematic view illustrating change in flow of dredged soil caused by a dredged soil transport system according to an exemplary embodiment of the present invention.

A Newtonian fluid dominated by viscosity in flow inside a pipeline becomes dominant force on a wall surface of the pipeline, and an inertial force in turn becomes a dominant force toward a center of the pipeline. At this time, flow velocity develops as a function in response to a radius of the pipeline.

However, the dredged soil shows not a Newtonian fluid behavior, but a non-Newtonian fluid behavior, where yield stress for forming flow becomes an important element along with the viscosity of fluid.

FIG. 2 is a schematic view illustrating change in waveform of non-Newtonian fluid in the Newtonian fluid, where (a) shows a waveform of pure water having a low viscosity, (c) shows a waveform of dredged soil or mortar, (b) shows a waveform of fluid having a viscosity between (a) and (c), and (d) shows a waveform of high viscosity fluid such as concrete.

The flow velocity in the flow takes a different shape from that of a Newtonian fluid due to action between the yield stress and viscosity, and particularly, characteristic of flow velocity in the mixture such as dredged soil takes the shape as illustrated in FIG. 1.

Referring to FIG. 1, an inner surface of the pipeline is formed with a flow-generating slip layer or slip layer zone due to influence of viscosity, and the inner surface shows a plug flow zone similar to rigid body motion toward a central layer of the pipeline.

When the mixture such as the dredged soil is moved by growing pressure due to inertia and viscosity, components having a greater mass moves to a center of pipeline, and the slip layer at the surface of the pipeline is flowed with particles such as water and mud having relatively smaller mass.

Thus, friction at the pipeline may largely act in three ways due to flow characteristics, that is, friction between the pipeline and fluid, friction factor and friction between the slip layer and central layer, and control of these frictions may reduce the friction with the pipeline across the board.

The method to reduce the frictional force may include, as a subject of consideration, increase in flow velocity of slip layer, decrease in viscosity of slip layer forming element or increase in thickness of slip layer.

The decrease in friction with the pipeline will eventually reduce the pressure fall amount of fluid inside the pipeline to thereby increase the flow velocity, whereby consumption of power generating the pressure for transfer can be reduced.

FIG. 3 is a schematic view illustrating change in flow of dredged soil caused by a dredged soil transport system according to an exemplary embodiment of the present invention.

The present invention is to control flow of dredged soil by reducing the flow friction resistance force by forming a tornado on the plug type fluid by applying electromagnetic field (206) on a pipeline (205), after forming a plug flow that flows by being divided to a gaseous unit and a liquefied unit by introducing compressed air into the pipeline using a pump module (100) inside the pipeline (205).

That is, the most important core technology of the present invention may be described in the following manner:

Although a conventional transport method using compressed air has an inconvenience that requires transport of dredged soil by pouring water, the present invention is such that plug flow is generated to form an environment inside the pipeline with a gaseous unit and a liquefied unit, and an electromagnetic field is applied to the liquefied unit to generate a tornado.

That is, the present invention is not to simply apply an electromagnetic field but to form a fluid film on a slip layer divided by a liquefied unit (10) and a gaseous unit (20) whereby a flow guide line can be generated. Furthermore, the present invention is a control technique where an electromagnetic wave is generated that is applied with information on liquefied unit element and flow parameters (flow amount/flow velocity/flow pressure), whereby the liquefied unit is expressed in the form of tornado to greatly reduce the flow frictional force and to transport the dredged soil.

The flow of dredged soil by the long distance dredged soil transport system according to the present invention is to generate a tornado flow as shown in a waveform at the far right side of FIG. 3, by applying adequate electromagnetic field according to flow state of the liquefied unit (10).

Now, the long distance dredged soil transport system according to the present invention using the electromagnetic field and tornado eddy current technologies for embodying the technical idea of the present invention thus described will be explained in the following manner.

Figure 4:
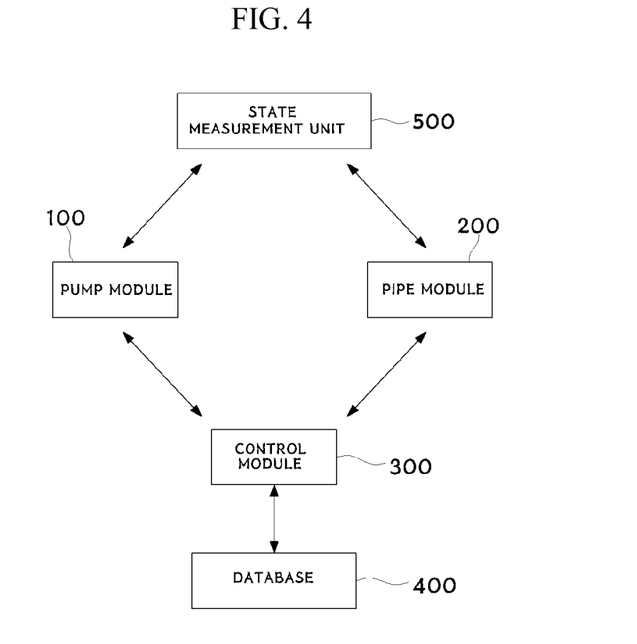
FIG. 4 is a schematic view illustrating a dredged soil transport system according to an exemplary embodiment of the present invention.
Figure 5:
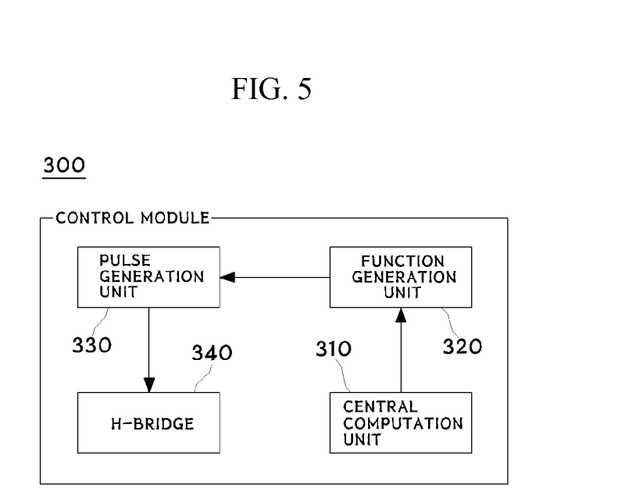
FIG. 5 is a schematic view illustrating a control module of a dredged soil transport system for a long distance using an electromagnetic field and a tornado eddy current according to an exemplary embodiment of the present invention.
Figure 6:
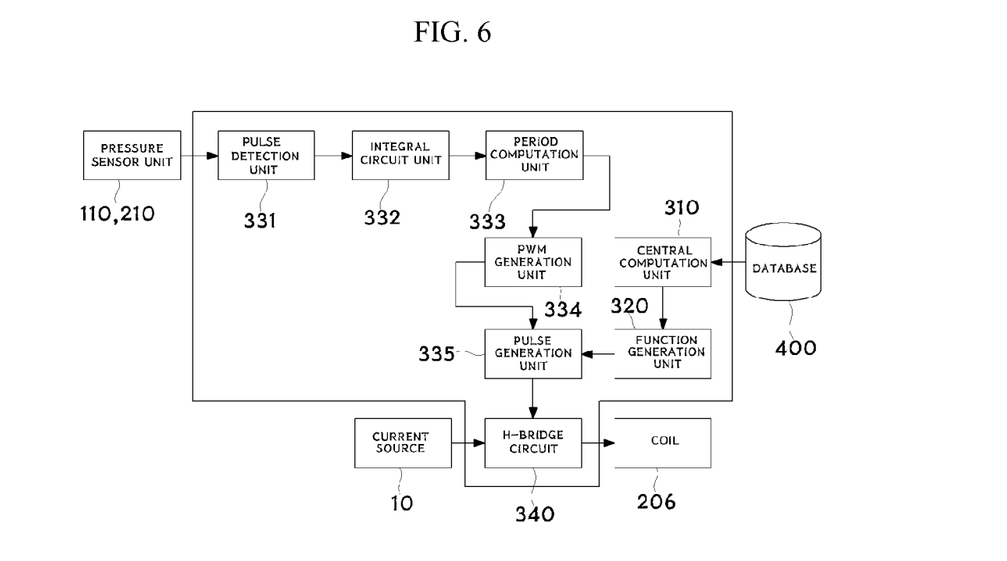
FIG. 6 is a schematic view illustrating an overall operation flow for applying an electromagnetic field to a dredged soil transport system for a long distance using an electromagnetic field and a tornado eddy current according to an exemplary embodiment of the present invention.

FIG. 4 is a schematic view illustrating a dredged soil transport system according to an exemplary embodiment of the present invention, FIG. 5 is a schematic view illustrating a control module of a dredged soil transport system for a long distance using an electromagnetic field and a tornado eddy current according to an exemplary embodiment of the present invention and FIG. 6 is a schematic view illustrating an overall operation flow for applying an electromagnetic field to a dredged soil transport system for a long distance using an electromagnetic field and a tornado eddy current according to an exemplary embodiment of the present invention.

Referring to FIG. 5, the dredged soil transport system according to an exemplary embodiment of the present invention may largely include a pump module (100), a pipe module (200), a control module (300), database (400) and a state measurement unit (500).

Referring to FIGS. 3 and 5, the pump module (100) may include a pump (not shown) for generating compressed air, and generates, by communicating with a lateral surface of the pipeline, a plug flow that flows by dividing a state inside a pipeline to a liquefied unit (10) and a gaseous unit (20) through introduction of compressed air into the pipeline. That is, the pump module (100) provides a transport pressure for transporting the liquefied unit (10) to the pipe module (200). The pump modules (100) are preferably arranged at the pipeline of the pipe module (200) each at a predetermined interval to apply pressure to each section whereby a flow velocity can be obtained.

Figure 7:
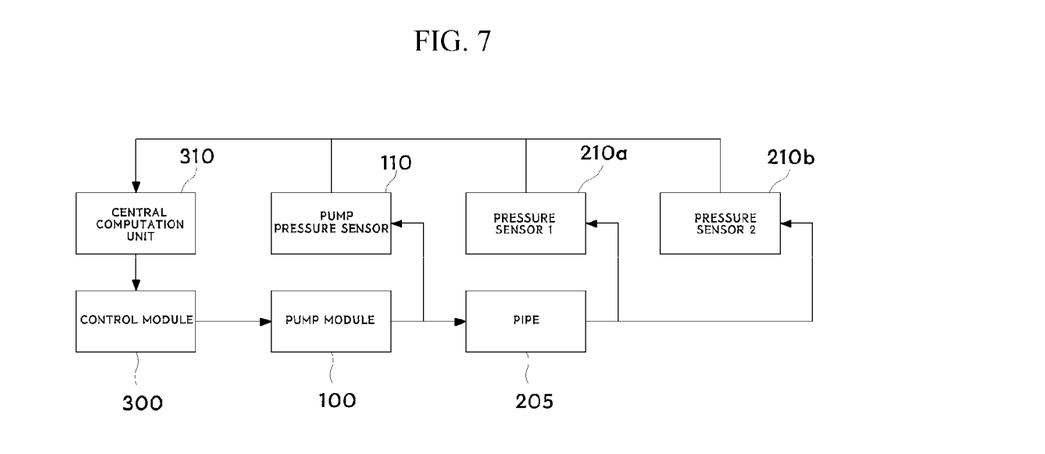
FIG. 7 is a schematic view illustrating an overall operation flow for measuring state of a dredged soil transport system for a long distance using an electromagnetic field and a tornado eddy current according to an exemplary embodiment of the present invention.

Furthermore, with reference to FIG. 7, the pump module (100) may include a pump pressure sensor unit (110) configured to grasp a stroke period of a pump and to convert the grasped stroke period of the pump to a voltage signal.

The pipe module (200) may include a plurality of pipelines (205) on which a coil (206, see FIG. 3) is wound to apply an electromagnetic wave to the liquefied unit (10).

To be more specific, the coil (206) is formed with a conductive material such as a copper, and is wound on the pipeline (205) to a flow direction of the liquefied unit (10) in consideration of Faraday's right hand rule. The pipeline (205) is formed by being connected with a plurality of pipelines (205) in consideration of long distance transport of dredged soil, and a diameter of the pipeline (205) is preferably 0.5 m for efficient transport of dredged soil, but it should be apparent that the diameter of the pipeline may be changed in consideration of dredged soil and construction period.

Referring to FIG. 7 again, the pipe module (200) may include a pipe pressure sensor unit (210) configured to grasp flow velocity and waveform of the liquefied unit (10) transported into the pipeline (205) and to convert the grasped flow velocity and waveform of the liquefied unit (10) to a voltage signal. The pipe pressure sensor unit (210) may be a first pressure sensor (210*a*) and a second pressure sensor (210*b*) each installed by being spaced apart at a predetermined distance.

The database (400) is stored with flow information on flow velocity and waveform according to physical properties of the liquefied unit (10). The flow information of liquefied unit (10) stored in the database (400) is preferably updated, added, changed or deleted by being connected wiredly or wirelessly by a user.

The control module (300) may wiredly or wirelessly communicate with the pipe module (200), the pump module (100) and the database (400) and apply, to the coil (206, see FIG. 3), a current of waveform matching to the flow waveform of the liquefied unit (10) transported into the pipeline (205).

To be more specific, referring to FIG. 6, the control module (300) according to an exemplary embodiment of the present invention may include a central computation unit (310), a function generation unit (320), a pulse generation unit (330) and a bridge circuit unit (340).

The central computation unit (310) generates a flow signal for controlling the transport of liquefied unit (10) by comparing the flow velocity and waveform in response to the physical properties of the liquefied unit (10) received from the database (400) with actual flow velocity and waveform of the liquefied unit (10) transported into the pipeline (205).

The function generation unit (320) receives a flow signal from the central computation unit (310) and converts the flow signal to function.

The pulse generation unit (330) receives a voltage signal from the pipe pressure sensor unit (210), and receives the function from the function generation unit (320), and converts the voltage signal received from the pipe pressure sensor unit (210) to a pulse signal using the function.

To be more specific, referring to FIG. 6, the pulse generation unit (330) may include a pulse detection unit (331) configured to detect an amplitude and period of the pulse of the voltage signal by receiving the voltage signal from the pipe pressure sensor unit (210), an integral circuit unit (332) configured to convert a pressure waveform energy proportional to the pulse waveform period to a voltage signal by receiving an amplitude and size of the pulse detected by the pulse detection unit (331), a PWM generation unit (334) configured to generate a PWM period pulse in response to the pulse waveform period by receiving the voltage signal from the integral circuit unit (332), a pulse generation unit (335) configured to convert the PWM period pulse received from the PWM period generation unit (334) using the function received from the function generation unit (320), and to convert the converted PWM period pulse to a gate voltage of the bridge circuit unit (340).

The bridge circuit unit (340) converts the current received from outside to a current having the pulse signal by receiving the pulse signal from the pulse generation unit (330), and applies the current to the coil (206, see FIG. 3).

Now, operation of long distance dredged soil transport system according to an exemplary embodiment of the present invention will be described in detail with reference to FIG. 7.

The long distance dredged soil transport system according to an exemplary embodiment of the present invention is such that flow velocity of the liquefied unit (10) is grasped from the stroke period detected by the pump pressure sensor unit (110) formed on the pump module (100), relative to the liquefied unit (10) of plug flow that flows by being divided to the gaseous unit (20) and the liquefied unit (10) generated by the pump module (100), and converts to a voltage signal by detecting waveform and period of the actually flowing liquefied unit (10) from the pipe pressure sensor unit (210) formed at the pipe module (200).

The control module (300) generates an optimal electromagnetic field for effective flow using actual flow information of the liquefied unit (10) and information on the physical properties of the liquefied unit (10) received from the database and applies to the coil (206. see FIG. 3) a waveform of special type that changes according to circumstances.

Meantime, the long distance dredged soil transport system according to an exemplary embodiment of the present invention may further comprise a state measurement unit (500) configured to monitor flow velocity and pressure change of dredged soil flow inside the pipeline (205) by controlling the control module (300) and the pump module.

FIG. 7 is a schematic view illustrating an overall operation flow for measuring state of a dredged soil transport system for a long distance using an electromagnetic field and a tornado eddy current according to an exemplary embodiment of the present invention.

Figure 8:
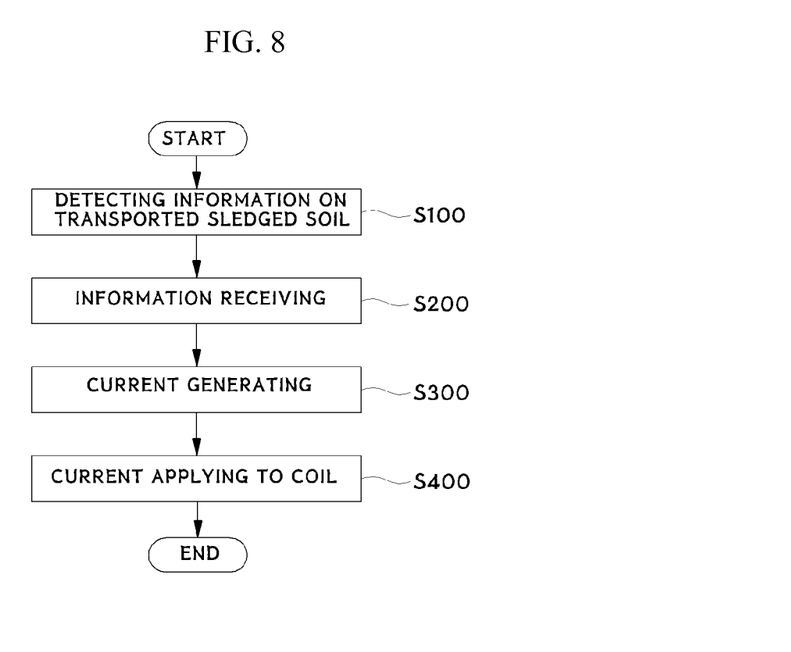
FIG. 8 is a schematic flowchart of a control method for a dredged soil transport system using an electromagnetic field and a tornado eddy current according to an exemplary embodiment of the present invention.

Referring to FIG. 8, the state measurement unit (500) according to an exemplary embodiment of the present invention may be included in the central computation unit (310) of the control module (300). The state measurement unit (500) can monitor the flow velocity and pressure change of flow in the liquefied unit (10) using the following equation.

$$\nabla p = f * \frac{L}{D} * \frac{\rho}{2} * v^2 \qquad <\text{Equation}>$$

where, f is a friction factor, L is a distance between first pressure sensor (210a) and second pressure sensor (210b), D is a diameter of pipeline (205), ρ is a density of liquefied unit (10), and v is a flow velocity obtained through pump pressure sensor.

The state measurement unit (500) can measure the pressure change using the abovementioned equation, and the central computation unit (310) can control the pump module (100) and the pipe module (200) in consideration of the measured state. That is, the central computation unit (310) can control the stroke of the pump and can control the electromagnetic field of the coil (205, see FIG. 3) wound on the pipeline (205).

Figure 9:
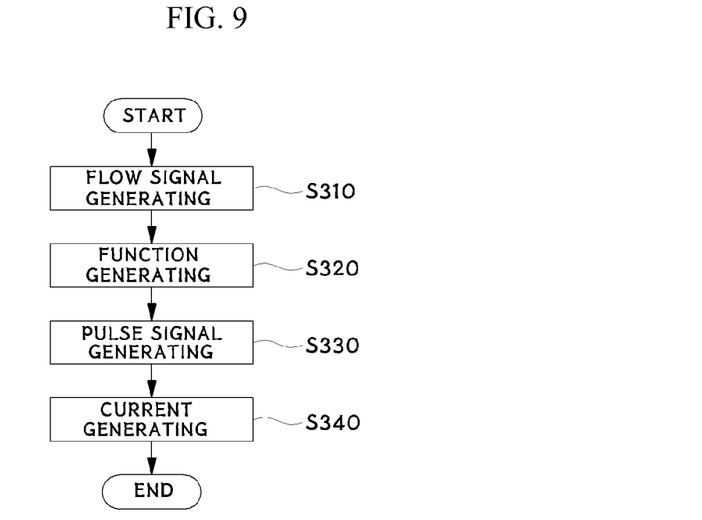
FIG. 9 is a detailed flowchart of S300 in FIG. 8.

Now, a control method of a long distance dredged soil transport system using magnetic field and tornado eddy current technique will be described in the following manner FIG. 8 is a schematic flowchart of a control method for a dredged soil transport system using an electromagnetic field and a tornado eddy current according to an exemplary embodiment of the present invention, and FIG. 9 is a detailed flowchart of S300 in FIG. 8.

Referring to FIG. 9, flow velocity and waveform of the liquefied unit (10) are first detected that are transported from the pressure sensors (110, 210a, 210b) formed at the pipe module (200) and pump module (100) relative to the liquefied unit (10) of plug flow that flows by being divided to the gaseous unit (20) and the liquefied unit (10) generated by the pump module (100) (S100).

Subsequently, flow velocity and waveform of the liquefied unit (10) detected by the above first step (S100) and the flow velocity and waveform in response to the physical properties of the liquefied unit (10) from the database (400) are received by the control module (300) (S200).

Then, comparison is made between the flow velocity and waveform in response to the physical properties of the liquefied unit (10) received from the database (400) and the flow velocity and waveform of the liquefied unit (10) detected by the above first step (S100) to generate a current (S300) of waveform corresponding to that of flow in the liquefied unit (10) transported into the pipeline (205).

Thereafter, the current thus generated is applied to the coil (206, see FIG. 3) wound on the pipeline (205) of the pipe module (200) (S400).

To be more specific, the S300 is controlled by the following flow.

A flow signal is generated for controlling transport of liquefied unit (10) based on actual flow velocity and waveform of the liquefied unit (10) (S310).

Then, a function is generated based on the flow velocity and waveform in response to the physical properties of the liquefied unit (10) received from the database (400) (S320).

Subsequently, the flow signal is converted to a pulse signal using the function (S330).

Then, a current supplied from outside is converted to a current having the pulse signal (S340).

In short, the present invention has an industrial applicability in that plug flow that flows by being divided to the gaseous unit (20) and the liquefied unit (10) generated by the pump module (100) is generated, flow velocity and waveform of the liquefied unit (10) actually flowing in the pipeline (205) are detected in real time, and comparison is made with the physical properties stored in the database (400) therewith to control the transport of the dredged soil, whereby the dredged soil can be efficiently transported with small energy to thereby enhance durability of subsidiary facilities according to the efficient transport.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The invention claimed is:

1. A long distance dredged soil transport system using an electromagnetic field and tornado eddy current technique, the system comprising:
    a pump module including a pump for generating a compressed air and generating a plug flow flowing by dividing an inner state of a pipeline to a gaseous unit and a liquefied unit by introducing the generated compressed air into the pipeline by being interlinked to one lateral surface of the pipeline;
    a pipe module wound with a coil configured to apply an electromagnetic wave to the liquefied unit and including a plurality of pipelines;
    database stored with flow information on flow velocity and flow form in response to physical properties of liquefied unit; and
    a control module communicating with the pipe module, the pump module and the database wiredly and wirelessly and applying, to the coil, a current of waveform matching to a flow waveform of the liquefied unit transported inside the pipeline.

2. The system of claim 1, wherein the pump module includes a pump pressure sensor unit configured to grasp a stroke period of the pump and to convert the grasped stroke period of the pump to a voltage signal, and the pipe module includes a pipe pressure sensor unit configured to grasp flow velocity and waveform of the liquefied unit transported into the pipeline and to convert the grasped flow velocity and the waveform to a pressure signal.

3. The system of claim 2, wherein the pipe pressure sensor unit includes a first pressure sensor and a second pressure sensor each installed by being spaced apart at a predetermined distance.

4. The system of claim 2, wherein the control module includes a central computation unit configured to generate a flow signal for controlling transport of the liquefied unit by comparing the flow velocity and waveform in response to the physical properties of the liquefied unit received from the database with an actual flow velocity and waveform of the liquefied unit transported into the pipeline, a function generation unit configured to convert the flow signal using a function by receiving the flow signal from the central computation unit, a pulse generation unit configured to convert the voltage signal received from the pipe pressure sensor unit to a pulse signal using the function by receiving the voltage signal received from the pipe pressure sensor unit and by receiving a function from the function generation unit, and a bridge circuit unit configured to receive the pulse signal from the pulse generation unit and to convert a current received from outside to a current having the pulse signal and to apply the converted current to the coil.

5. The system of claim 4, wherein the pulse generation unit includes a pulse detection unit configured to detect an amplitude and a period of a pulse of the voltage signal by receiving the voltage signal from the pipe pressure sensor unit, an integral circuit unit configured to convert a pressure waveform energy proportional to a pulse waveform period to a voltage signal by receiving the amplitude and size detected by the pulse detection unit, a PWM (Pulse Width Modulation) generation unit configured to generate a PWM period pulse in response to a pulse waveform period by receiving a voltage signal from the integral circuit unit, and a pulse generation unit configured to convert the PWM period pulse received from the PWM generation unit using the function received from the function generation unit, and to convert the converted PWM period pulse to a gate voltage of the bridge circuit unit.

6. The system of claim 3, further comprising a state measurement unit configured to monitor flow velocity and pressure change of the liquefied unit inside the pipeline.

7. The system of claim 6, wherein the state measurement unit monitors the flow velocity and pressure change of flow inside the liquefied unit using the following equation:

$$\nabla p = f * \frac{L}{D} * \frac{\rho}{2} * v^2 \qquad <\text{Equation}>$$

where, f is a friction factor, L is a distance between first pressure sensor and second pressure sensor, D is a diameter of pipeline, ρ is a density of liquefied unit, and v is a flow velocity obtained through pump pressure sensor.

8. The system of claim 1, wherein the flow information of the liquefied unit stored in the database is updatable, additionable, changeable and deletable.

9. A control method of dredged soil transport system including a pipe module configured to transport dredged soils, a pump module, database and a control module, the method comprising:

a first step of detecting flow velocity and waveform of a liquefied unit using a pressure sensor formed on the pipe module and the pump module relative to the liquefied unit of plug flow flowing by being divided to a gasified state and the liquefied unit generated by the pump module;

subsequently, a second step of receiving, by the control module, the flow velocity and waveform in response to physical properties from the flow velocity, the waveform and the database of the liquefied unit detected from the first step;

subsequently, a third step of generating a current of waveform matching to flow waveform of the liquefied unit transported inside the pipeline by comparing the flow velocity and waveform in response to the physical properties of liquefied unit received from the database with the flow velocity and waveform of the liquefied unit detected from the first step; and subsequently, a fourth step of applying the generated current to a coil wound on the pipeline of the pipe module.

10. The control method of claim 9, wherein the third step includes a 3-1 step of generating a flow signal for controlling transport of the liquefied unit based on an actual flow velocity and waveform of the liquefied unit detected from the first step, subsequently, a 3-2 step of generating a function based on the flow velocity and waveform in response to the physical properties of the liquefied unit received from the database, subsequently, a 3-3 step of converting the flow signal to a pulse signal using the function; and subsequently, a 3-4 step of converting a current received from outside to a current having the pulse signal.

* * * * *